United States Patent Office 3,519,326
Patented July 7, 1970

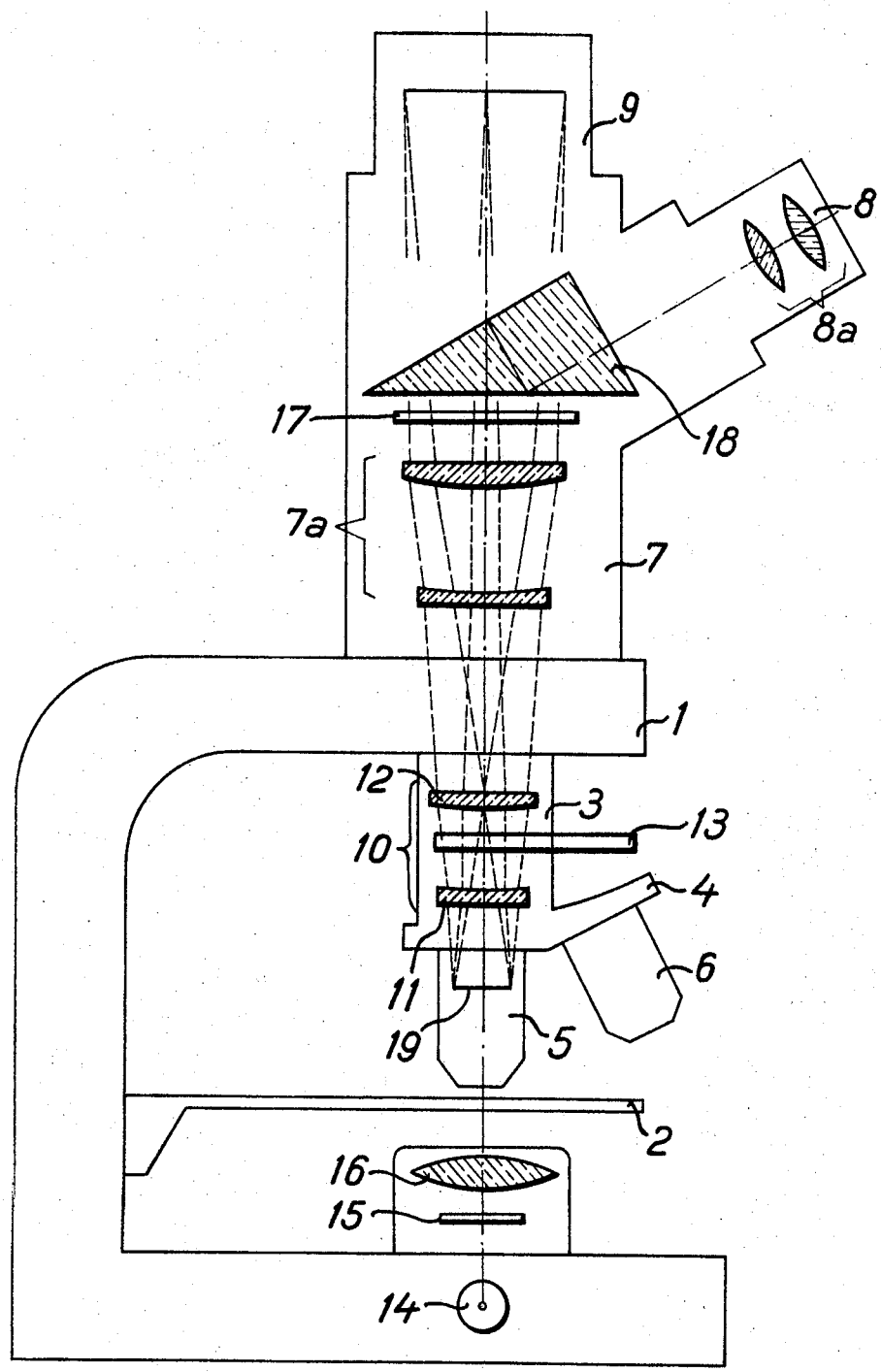

3,519,326
POLARIZING MICROSCOPE HAVING
COMPENSATION MEANS
Walter Klein, Wissmar uber Giessen, and Franz Kornder, Wetzlar, Germany, assignors to Ernst Leitz G.m.b.H., Wetzlar, Germany
Filed June 10, 1968, Ser. No. 735,667
Claims priority, application Germany, June 21, 1967, 1,572,718
Int. Cl. G02b 27/28
U.S. Cl. 350—14                                1 Claim

ABSTRACT OF THE DISCLOSURE

A tube lens system is disposed in the tube of a polarizing microscope. Two lenses of this system are designed and arranged so as to generate a parallel path of light rays between them, and compensation means are provided for insertion into the path of light rays.

BACKGROUND OF THE INVENTION

Field of the invention

The present invention relates to polarizing microscopes.

Description of the prior art

To those skilled in this particular art it is known that various types of compensation means can be mounted interchangeably between the objective and the ocular of the microscope. Disposing these compensation means in a convergent path of light rays, however, entails a number of disadvantages. For example the insertion and removal as well as the tilting of the means always causes a slight shift of focus which requires refocusing of the image. Besides, the tilting of the compensation means causes a point of the objective previously adjusted to the center of a reticle to be displaced laterally; and further when performing an exact measurement the parallel displacement of the system of interference fringes caused by the tilting of the compensation means must be compensated for by a correction of the function of the compensation means.

These disadvantages do not exist, however, if the compensation means are introduced into a parallel path of light rays. To this end, it has already been suggested by the prior art to insert the compensation means between the two elements of the analyzer system of the polarizing microscope, where a parallel path of rays does exist. In modern microscopes, however, the analyzer systems are disposed within or above a solid portion of the stand or tube on top of which various observation tubes are mounted interchangeably. Beneath this stand portion various objective changing devices are arranged which are also interchangeable. As a consequence, the analyzer systems are positioned relatively distant from the objective pupils, and since the compensation means in general have very small apertures heavy vignetting results from the insertion of the compensation means between the elements of the analyzer system.

SUMMARY OF THE INVENTION

It is therefore an object of the invention to overcome the above described disadvantages. It is a further object to provide a polarizing microscope comprising a compensation means which requires no refocusing of the object image when the compensation means are introduced in the path of rays.

These objects are attained by incorporating a tube lens system of known design into the objective carrier portion of the microscope tube, which tube lens system comprises two lens elements between which a parallel path of light rays exists and by inserting one of various compensation means a desired into said parallel path of light rays. The basic idea of the invention, in contradiction to the prior art devices, is therefore first to incorporate into the microscope an additional tube lens system close to the objective pupils which system is adapted to create a parallel light path. Second to introduce the compensation means into this light path also close to the objective pupils, thus avoiding any noticeable vignetting.

DESCRIPTION OF THE DRAWING

The invention will be more readily understood from the following description when taken in conjunction with the accompanying drawing which shows schematically a polarizing microscope with objective carrier portion and nose-piece.

DESCRIPTION OF THE PREFERRED EMBODIMENT

Referring to the drawing it will be seen that the stand 1 of the microscope is provided with a stage 2, an objective carrier portion 3, a nose-piece 4 and objectives 5 and 6. By the numeral 19 is designated the exit pupil of objective 5.

In the substage area are arranged a light source 14, a polarizer 15 and a condenser lens 16.

On the stand 1 is mounted a tube 7 comprising a tube lens 7a, an analyzer 17 and a prism 18. An observation tube 8 with ocular 8a is part of tube 7 which in its upper portion also provides a socket 9 for a photomicrographic device (not shown).

An additional tube lens system 10 is mounted in the objective carrier portion 3, said system comprising the lens elements 11 and 12. Between the latter does exist a parallel path of light rays into which the compensation means 13 may be introduced.

What is claimed is:
1. A polarizing microscope comprising:
a stand,
a light source combined with said stand,
means for polarizing supported by said stand and proximate said light source, said light source defining a light path,
an objective carrier portion supported by said stand in said light path,
objective means proximate said means for polarizing in said light path and within said objective carrier portion,
two lens elements proximate said objective means in said light path and within said objective carrier portion defining a first tube lens system having a parallel path of light rays,
compensation means insertible between two said lens elements in said parallel path of light rays,
a second tube lens system supported by said stand proximate said first tube lens system in said light path,
means for analyzing proximate said second tube lens system in said light path and supported by said stand, and
an ocular proximate said means for analyzing in said light path and supported by said stand.

References Cited

UNITED STATES PATENTS 2,700,918   2/1955   Osterberg et al. _____ 350—15 XR

DAVID SCHONBERG, Primary Examiner
P. R. MILLER, Assistant Examiner

U.S. Cl. X.R.
350—13, 15, 157